United States Patent
Botez

(10) Patent No.: US 8,574,106 B2
(45) Date of Patent: Nov. 5, 2013

(54) HYDRAULIC TENSIONER

(75) Inventor: Lucian Botez, Novi, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 112 days.

(21) Appl. No.: 13/047,041

(22) Filed: Mar. 14, 2011

(65) Prior Publication Data

US 2011/0263366 A1 Oct. 27, 2011

Related U.S. Application Data

(60) Provisional application No. 61/327,237, filed on Apr. 23, 2010.

(51) Int. Cl.
 *F16H 7/08* (2006.01)
(52) U.S. Cl.
 USPC ........................................... 474/110
(58) Field of Classification Search
 USPC .......... 474/101, 103, 104, 109, 110, 111, 273
 See application file for complete search history.

(56) References Cited

U.S. PATENT DOCUMENTS

| | | | | |
|---|---|---|---|---|
| 4,507,103 | A * | 3/1985 | Mittermeier | 474/110 |
| 6,361,458 | B1 * | 3/2002 | Smith | 474/109 |
| 7,608,004 | B2 * | 10/2009 | Yoshida et al. | 474/110 |
| 2008/0015069 | A1 | 1/2008 | Kroon et al. | |
| 2008/0280712 | A1 * | 11/2008 | Ryouno et al. | 474/110 |

FOREIGN PATENT DOCUMENTS

| | | |
|---|---|---|
| DE | 10327024 | 1/2004 |
| EP | 0067314 | 5/1982 |
| EP | 0952375 | 10/1999 |
| EP | 1101975 | 5/2001 |
| EP | 1201964 | 5/2002 |
| EP | 1258655 | 11/2002 |

* cited by examiner

*Primary Examiner* — Sang Kim
*Assistant Examiner* — Juan Campos, Jr.
(74) *Attorney, Agent, or Firm* — Volpe and Koenig, P.C.

(57) ABSTRACT

A hydraulic tensioner for a traction element drive of an internal combustion engine, is provided having a tensioner housing with a hollow piston located in the housing bore. A check valve is located in the bore along a pressurized fluid path to the hollow piston, and a spring guide located in the housing in proximity to a base of the bore. A tensioning spring extends from the spring guide inside the hollow piston toward the piston head. A pressure relief valve is located within the hollow piston adjacent to the piston head, with the pressure relief valve including a valve body having a flange with a support surface that rests against an inside of the piston head and a hollow spring guide that extends from the flange toward the base of the bore. A valve seat is formed in the hollow spring guide, and a spring is located in the hollow spring guide and biases a valve ball against the valve seat. At least one of the support surface of the flange, the valve seat or the valve ball include surface indentations or irregularities that allow gas venting through the pressure relief valve.

7 Claims, 3 Drawing Sheets

HYDRAULIC TENSIONER

CROSS-REFERENCE TO RELATED APPLICATIONS

This application claims the benefit of U.S. Provisional Application No. 61/327,237, filed Apr. 23, 2010, which is incorporated herein by reference as if fully set forth.

FIELD OF INVENTION

The invention relates to a hydraulic tensioner for a traction element drive of an internal combustion engine, and in particular a hydraulic tensioner for a chain drive system.

BACKGROUND

Hydraulic tensioners for traction element drives, such as chain or belt drives, of internal combustion engines are known, for example from U.S. 2008/0015069. Because the length of the traction element changes due to heat and wear, its pre-tensioning must be readjusted continuously, and hydraulic tensioners have been proven to be the most reliable for this purpose. The hydraulic tensioners not only remove slack from the tension element, but can also compensate for vibration in order to maintain a firm contact between the guide element which is acted on by the tensioner and the traction element.

In many cases due to the high dynamics of the chain drive systems, high and fast tensioner displacements occur which result in abnormal peak pressures inside the high pressure chamber of the hydraulic tensioner. These peak pressures are highly undesirable as they create high loads on the traction element which can result in early failure of the traction element or one or more of the traction element guides. In order to avoid this, pressure relief valves have been incorporated into hydraulic tensioners, for example within the piston head of the tensioning piston as shown in U.S. 2008/0015069, or within the space inside the piston, for example as shown in EP 1 101 975. Other known tensioners are shown in EP 0 952 375, EP 0 067 314, DE 103 27 024, EP 1 258 655 and EP 1 201 964.

These known devices suffer from relatively complex and costly construction while not providing an effective means to not only vent or de-aerate any air trapped within the high pressure chamber, which can lead to a soft or spongy tensioning force, but also to provide a reduced volume for the high pressure chamber, which allows the tensioner to reach its full working characteristic as quickly as possible upon engine start up.

SUMMARY

The present invention relates to a hydraulic tensioner for a traction element drive of an internal combustion engine, having a tensioner housing with a hollow piston located in the housing bore. A check valve is located in the bore along a pressurized fluid path that leads to the hollow piston. A tensioning spring extends from the bore and inside the hollow piston toward the piston head. A pressure relief valve is located within the hollow piston adjacent to the piston head, with the pressure relief valve including a valve body having a flange with a support surface that rests against an inside of the piston head and a hollow spring guide that extends from the flange toward the base of the bore. A valve seat is formed in the hollow spring guide, and a spring is located in the hollow spring guide and biases a valve ball against the valve seat. At least one of the support surface of the flange, the valve seat or the valve ball include surface indentations or irregularities that allow gas venting through the pressure relief valve.

In another aspect of the invention, a spring guide is located in the housing in proximity to a base of the bore, and the tensioning spring extends from the spring guide to inside of the tensioning piston.

In another aspect of the invention, the volume of the high pressure chamber formed within the hollow piston is reduced due to the hollow spring guide extending in the high pressure chamber in comparison to similar known hydraulic tensioners.

In another aspect of the invention, the surface indentations or irregularities have a sufficient depth, waviness and/or interconnections to allow the passage of air.

In another aspect, the surface of the flange, the valve seat or the valve ball is shot-peened or textured to form the surface indentations or irregularities.

Further, in another aspect of the invention, a spring retainer is located in the hollow spring guide and supports the spring. This allows the pressure relief valve, including the valve body, the valve ball, the spring and the spring retainer to be pre-assembled as a unit for incorporation into the hydraulic tensioner, reducing both cost and assembly time.

In a further aspect of the invention, in order to provide for venting or de-aeration, a clearance gap is located between the flange of the valve body and an inner surface of the hollow piston.

In a further aspect of the invention, the check valve includes a check valve body with a valve seat, a check valve ball biased against the check valve seat by a check valve spring, and a spring support that engages with the check valve body. The check valve is pre-assembled as a unit for incorporation into the hydraulic tensioner, again further reducing cost and assembly time.

The above-noted features can be used individually or in various combinations in accordance with the invention in order to provide various improvements depending upon the particular circumstances.

BRIEF DESCRIPTION OF THE DRAWINGS

The foregoing Summary and the following detailed description will be better understood when read in conjunction with the appended drawings, which illustrate preferred embodiments of the invention. In the drawings.

DETAILED DESCRIPTION OF THE PREFERRED EMBODIMENTS

Figure 1:
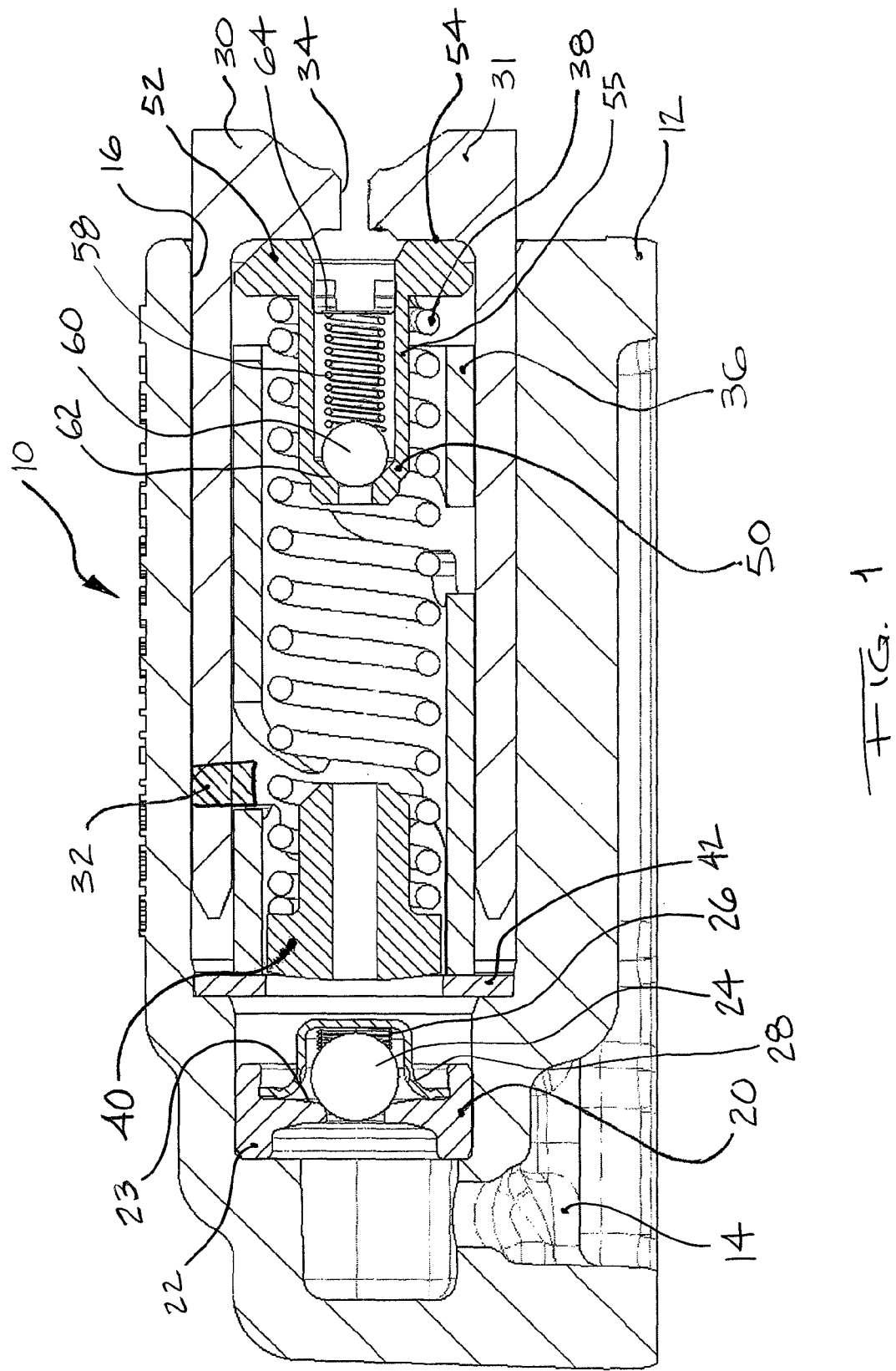
FIG. 1 is a cross-sectional view through a hydraulic tensioner according to the invention.

Certain terminology is used in the following description for convenience only and is not limiting. The words "left" and "right" designate directions in the drawings to which reference is made. The words "inwardly" and "outwardly" refer to directions toward and away from the parts referenced in the drawings. A reference to a list of items that are cited as "at least one of a, b or c" (where a, b and c represent the items being listed) means any single one of the items a, b or c, or combinations thereof. The terminology includes the words specifically noted above, derivatives thereof and words of similar import.

Referring to FIG. 1, hydraulic tensioner 10 for a traction element drive of an internal combustion engine is shown. The hydraulic tensioner 10 includes a tensioner housing 12 having a bore 16 in which a hollow tensioning piston 30 is located. The piston 30 includes a piston head 31 that can extend out from the housing 12 in order to press a traction element tensioning guide (not shown) against a traction element, such as a chain or belt. A pressure relief opening 34 is defined through the piston head 31.

Still with reference to FIG. 1, a check valve 20 is located in the housing 12 at the base of the bore 16 along a pressurized fluid path 14 that leads from a source of pressurized hydraulic medium, such as the pressurized oil system of an internal combustion engine, to the hollow piston 30.

The check valve 20 includes a valve body 22 with a valve seat 23. A check valve ball 24 is biased against the check valve seat 23 via a check valve spring 26. A spring support 28, which is generally hat-shaped, engages with the check valve body 22 and holds the spring 26 in position in order to bias the check valve ball 24 against the valve seat 23. Preferably, a periphery of the spring support 28 is press fit or otherwise engaged in a corresponding recess in the check valve body 22. The check valve 20 is preferably a pre-assembled unit that can be incorporated into the hydraulic tensioner 10 as one piece during assembly.

Preferably, a spring guide 40 is located in the housing 12 in proximately to a base of the bore 16. The spring guide 40 is preferably a hollow stepped cylinder that is located within the end of the hollow tensioning piston 30.

A tensioning spring 38 extends from the spring guide 40 toward the piston head 31. The tensioning spring 38 is preferably seated on the step formed in the spring guide 40. It is possible for the spring support 40 to be omitted and for the tensioning spring 38 to rest directly against a back of the check valve 20 or an intermediate support 42 located in the housing 12.

Preferably, a ratchet pin 32 is located in the tensioning piston and is engagable with a ratchet coil 36 having a plurality of indexed steps. The pin 32 limits a return movement of the piston 30 in order to prevent over compression due to fluctuating loads on the traction element. While a ratchet coil 36 and ratchet pin 32 are shown, those skilled in the art will recognize that different ratchet system designs or a tensioner without a ratchet system can be utilized.

Figure 2:
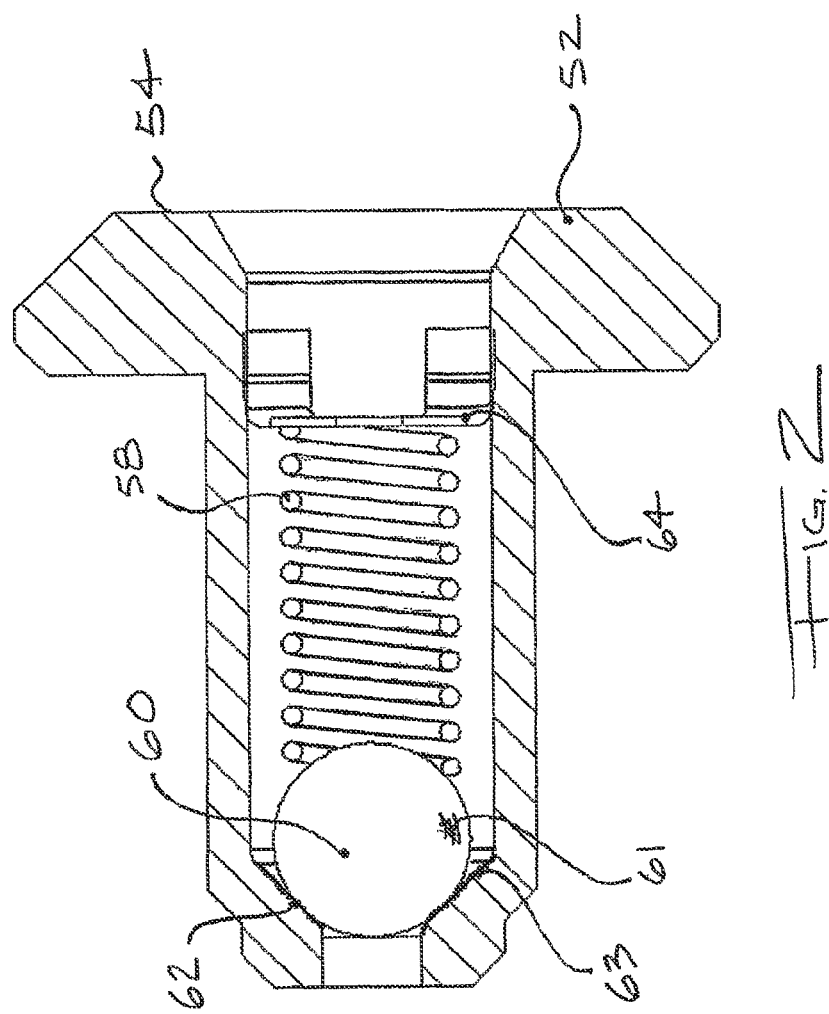
FIG. 2 is an enlarged cross-sectional view showing the pressure relief valve in the hydraulic tensioner shown in FIG. 1.

Referring to FIGS. 1 and 2, a pressure relief valve 50 is located within the hollow piston 30 adjacent to the piston head 31. The pressure relief valve 50 includes a valve body 52 having a flange 54 with a support surface that rests against an inside of the piston head 31. A hollow spring guide 55 extends preferably integrally from the flange 54 towards the base of the bore 16. A valve seat 62 is formed within the hollow spring guide 55. A spring 58 is located in the hollow spring guide 55 and biases a valve ball 60 against the valve seat 62. At least one of the support surface of the flange 54, the valve seat 62 or the valve ball 60 includes surface indentations or irregularities that allow gas venting through the pressure relief valve 50.

Figure 3:
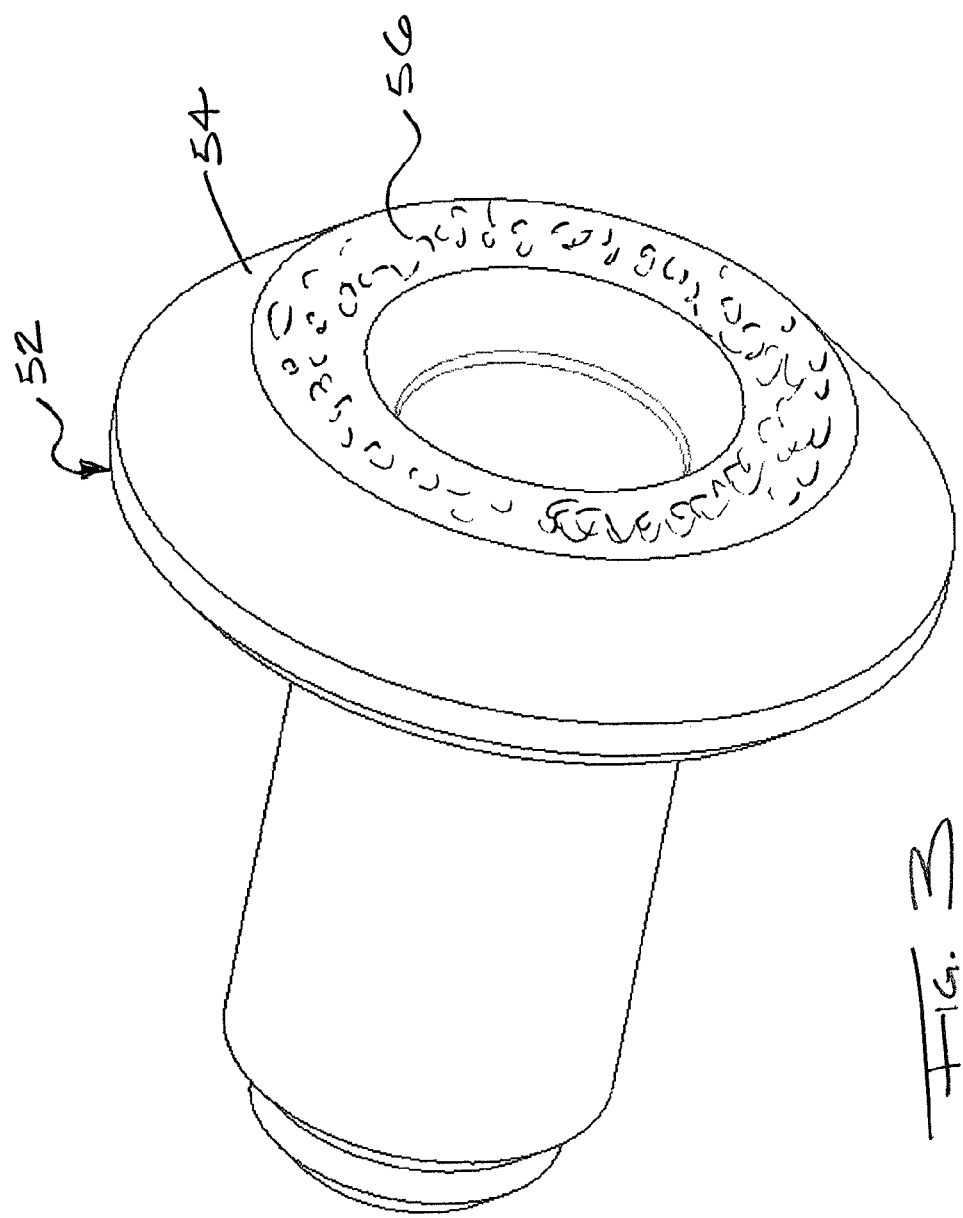
FIG. 3 is an enlarged perspective view showing the valve body of the pressure relief valve shown in FIGS. 1 and 2.

In a preferred embodiment, the surface indentations or irregularities are made by shot-peening or texturing at least one of the surface of the flange, the valve seat or the valve ball. Alternative forms can be used to create the surface indentations or irregularities, indicated most clearly at 56 in FIG. 3, such as the use of a forming tool, a deburring tool, a knurling tool or any other suitable methodology. In the preferred embodiment, the surface indentations or irregularities have a sufficient depth, waviness and/or interconnections to allow the passage of air.

A spring retainer 64 is preferably located or press-fit within the hollow spring guide 55 and supports the spring 58. In the preferred embodiment, this allows the pressure relief valve 50 to be pre-assembled as a unit for incorporation into hydraulic tensioner 10.

Referring again to FIG. 1, a clearance gap is located between the flange 54 and the inner surface of the hollow piston 30, and a periphery of the flange 54 is beveled on a side facing the piston head 31. This allows de-aeration by the passage formed around the flange 54 and through the non-sealing contact created between the surface of the flange 54 having indentations or irregularities and the inside of the piston head 31. Similarly, de-aeration can occur via the non-sealing contact between the pressure relief valve ball 60 and the valve seat 62 due to the surface indentations or irregularities provided on one or both of the surfaces of these parts, indicated at 61 and 63, respectively, in FIG. 2. According to the invention, the venting or de-aeration can occur either at the interface between the flange 54 and the inside of the piston head 31 or at the inner face between the valve seat 62 and the ball 60, or at both locations.

Referring again to FIG. 1, according to the invention the high pressure chamber defined within the hollow piston 30 has a reduced volume based on the valve body 52 and in particular the hollow spring guide 55 extending into the high pressure chamber. The hollow spring guide 55 preferably reduces the volume of the high pressure chamber in comparison to the prior known tensioners that do not include the hollow spring guide 55 which houses the pressure relief valve 50. This is extremely important for faster response times during engine start up as the tensioner 10 can reach its full working characteristic sooner since the smaller high pressure chamber provided by the invention fills with oil faster.

The tensioner 10 according to the present invention provides the further advantage of allowing for both de-aeration as well as reducing the volume of the high pressure chamber within the same envelope as the prior known tensioners so that no additional space is required within the engine compartment. Specifically, the overall dimensions of the tensioner 10 can remain constant when compared to a tensioner that does not have the relief valve with provisions for not only de-aeration of the high pressure chamber but also reducing the size of the high pressure chamber.

In use, the hydraulic tensioner 10 compensates for slack in a traction element and also acts as a vibration compensating element maintaining a firm contact between a traction element guide connected to the tensioning piston 30 and the traction element (not shown) in order to eliminate sponginess due to air bubbles caught in the high pressure chamber, venting or de-aeration is provided via the small indentations or irregularities on the flange 54 and/or on the pressure relief valve ball 60 or valve seat 62, which allow air in the high pressure chamber to vent out through the pressure relief opening 34 in the piston head 31.

Having described the present invention in detail, it should be appreciated by those skilled in the art that many physical changes could be made without altering the inventive concepts and principals provided by the invention. It will also be appreciated that numerous embodiments incorporating only part of the preferred embodiment are possible which do not alter, with respect to those parts, the inventive concepts and principals embodied therein. The present embodiment and optional configurations are therefore to be considered in all respects as exemplary and/or illustrative and not restrictive, and the scope of the invention is indicated by the appended claims rather than by the foregoing detailed description, and all alternate embodiments and changes within the meaning and range of equivalency of the claims are therefore to be embraced therein.

What is claimed is:

1. A hydraulic tensioner for a traction element drive of an internal combustion engine, comprising a tensioner housing having a bore, a hollow piston located in the bore, the hollow piston having a piston head that extends out from the housing, with a pressure relief opening defined through the piston head, a check valve located in the bore along a pressurized fluid path to the hollow piston, and a tensioning spring extending from the bore inside the hollow piston toward the piston head, and a pressure relief valve located within the hollow piston adjacent to the piston head, the pressure relief valve including a valve body having a flange with a support surface that rests against an inside of the piston head and a hollow spring guide that extends from the flange toward the base of the bore, a valve seat is formed in the hollow spring guide, a spring is located in the hollow spring guide and biases a valve ball against the valve seat, at least one of the support surface of the flange, or the valve seat include surface irregularities that allow gas venting through the pressure relief valve.

2. The hydraulic tensioner according to claim 1, wherein a spring guide is located in the housing in proximity to a base of the bore, and the tensioning spring is supported on the spring guide.

3. The hydraulic tensioner according to claim 2, wherein a high pressure chamber is defined within the hollow piston, and the hollow spring guide of the pressure relief valve reduces a volume of the high pressure chamber.

4. The hydraulic tensioner according to claim 1, wherein a spring retainer is located in the hollow spring guide and supports the spring.

5. The hydraulic tensioner according to claim 1, wherein the valve body, the valve ball, and the spring are pre-assembled and held together by a spring retainer as a pre-assembled unit for incorporation into the hydraulic tensioner.

6. The hydraulic tensioner according to claim 1, wherein a clearance gap is located between the flange and an inner surface of the hollow piston, and a periphery of the flange is beveled on a side facing the piston head.

7. The hydraulic tensioner according to claim 1, wherein the check valve comprises a pre-assembled unit that includes a valve body with a valve seat, a check valve ball biased against the check valve seat by a check valve spring, and a spring support that engages with the check valve body, for incorporation into the hydraulic tensioner.

* * * * *